March 2, 1971  H. REES  3,566,444
SCRAP GRINDER FOR INJECTION-MOLDING MACHINE
Filed May 27, 1968
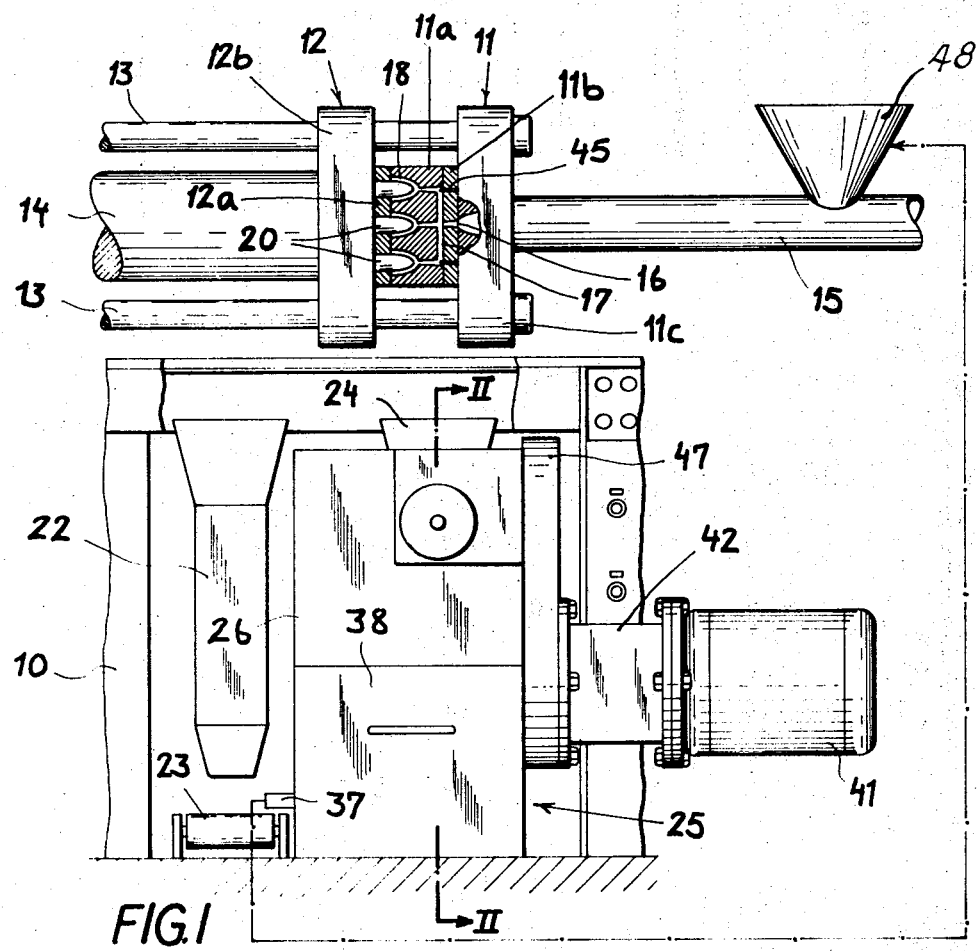
FIG. 1
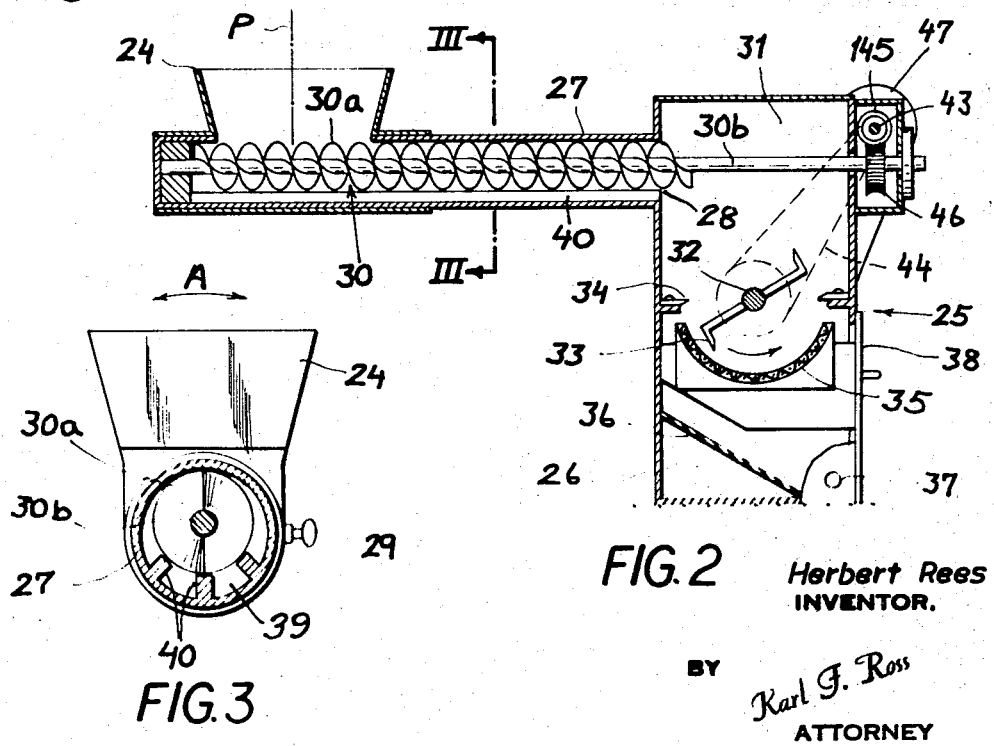
FIG. 2
FIG. 3
Herbert Rees
INVENTOR.
BY Karl F. Ross
ATTORNEY

# United States Patent Office 3,566,444
Patented Mar. 2, 1971

3,566,444
SCRAP GRINDER FOR INJECTION-
MOLDING MACHINE
Herbert Rees, Willowdale, Ontario, Canada, assignor to
Husky Manufacturing and Tool Works Limited, Toronto, Ontario, Canada
Filed May 27, 1968, Ser. No. 732,148
Int. Cl. B02c 18/44
U.S. Cl. 18—30         6 Claims

ABSTRACT OF THE DISCLOSURE

A grinder with rotary knives is positioned below the mold level of an injection-molding machine and offset from the mold path, an auger driven by the knife motor extending horizontally from a hopper beneath the mold path to the grinder mouth for delivering runners dropping from the opening mold to a lateral entrance of an otherwise closed knife housing.

---

My present invention relates to a scrap grinder to be used in conjunction with an injection-molding machine in which articles of thermoplastic material are formed together with associated runners in a split mold having two or more separatble portions. A molding machine of this type has been disclosed, for example, in my U.S. Pat. No. 3,117,348.

In my copending application Ser. No. 551,418 filed May 19, 1966, now Pat. No. 3,407,444, I have disclosed a grinder disposed underneath the mold in the path of ejection of the runners which drop from the mold at a location different from that where the molded articles are discharged. In order to bar any throwback of runner fragments toward the open mold by the rotating knives of the grinder, the latter also includes a rotary shutter which operates in timed relationship with the mold cycle and which also prevents an operator from accidentally reaching into the knife chamber.

The comminuted material falls from the grinder chamber through a screen into a receptacle whence this material is removed by a suction pipe. If suction fails, or if the screen becomes excessively clogged, the exhaustion of the resinous particles may not be rapid enough to prevent the formation of a dust cloud which, on escaping upwardly through the rotating shutter, may enter the open mold and contaminate its cavities. The general object of my present invention, therefore, is to provide an improved scrap grinder which, when used in conjunction with an injection-molding machine, avoids the risk of such contamination.

Another object of this invention is to provide a scrap grinder which can be positioned at the operator's side of the machine so as to be more readily accessible than the aforedescribed grinder for purposes of cleaning, inspection or readjustment.

These objects are realized, pursuant to my present invention, by the provision of a grinder housing disposed below the mold level of the associated molding machine but at a location offset from the point of ejection, the housing having a preferably laterally disposed inlet opening through which a scrap feeder, such as an auger, extends generally horizontally from a location directly below the point of ejection.

The entrance end of the scrap feeder may be formed with a hopper or funnel which, advantageously, is angularly adjustable so that no relocation of the grinder as a whole is required upon an adjustment or replacement of the mold.

Except for the inlet opening accommodating the auger or equivalent feed means, the grinder housing may be completely closed so as to exclude the danger of injury to an incautious operator. If the auger is powered by a frictional transmission, such as a belt drive, even an accidental insertion of one's fingers into the hopper during operation of the grinder will not lead to serious injury. Thus, I can use a single motor for driving both the rotary knives and the auger, the motor being preferably coupled with the knife rotor by a positive transmission which may include a speed reducer.

According to another feature of my invention, the auger is surrounded over part of its length by a tubular extension of the grinder housing having an axis downwardly offset from the auger axis so as to form a crescent-shaped clearance at the bottom of the feed channel. In this clearance I dispose one or more longitudinally extending ribs serving to prevent rotary entrainment of the runner fragments by the auger and to insure their axial displacement toward the knife chamber.

The above and other features of my invention will become more fully apparent from the following detailed description of a preferred embodiment, reference being made to the accompanying drawing in which:

FIG. 1 is a fragmentary front-elevational view of an injection-molding machine equipped with a built-in grinder according to the invention;

FIG. 2 is a cross-sectional view taken on the line II—II of FIG. 1; and

FIG. 3 is a cross-sectional view taken on the line III—III of FIG. 2.

The molding machine shown in the drawing comprises a frame 10 supporting a split mold composed of two principal portions 11 and 12, mold portion 11 being substantially stationary whereas mold portion 12 is axially reciprocable, along tie bars 13, for a periodic opening and closing of the mold as described in my aforementioned U.S. Pat. No. 3,117,348. The reciprocation of the mold portion 12 is brought about by a ram 14 linked to an intermittently driven crank not shown. Mold portion 11 communicates with a compression chamber in a piston housing 15 via a channel terminating in an orifice 16 at the interface of two relatively movable plates 11a, 11b of mold portion 11 which further includes a third stationary plate 11c. Mold portion 12 also comprises two relatively movable plates 12a and 12b.

A multiplicity of cavities 18 in mold portion 12 serve for the simultaneous manufacture of a like number of cup-shaped articles (not shown) which, upon a separation of mold portions 11 and 12, adhere to cores 20 on plate 12a while a runner structure initially formed in the interconnecting channels 17 stays in mold portion 11 where it is retained by conventional sucker pins 45 on the face of plate 11b. At a later point of the cycle, mold plate 12b separates from plate 12a and withdraws the cores 12 from which the articles are stripped by this relative motion to drop through a chute 22 onto a conveyor 23 which transports them toward a further destination. At substantially the same time, or slightly before, the mold plates 11a and 11b move apart to leave a clearance for the runner; promptly thereafter, plate 11b breaks away from plate 11c to an extent sufficient to withdraw the sucker pins 45, rigid with plate 11c, into plate 11b whereby the runner is liberated and drops into a hopper 24 below the mold portion 11.

Hopper 24 constitutes the inlet of a grinder 25 mounted on the base of machine frame 10 forwardly of the vertical axial plane P (FIG. 2) of the mold, thus at a location horizontally offset from the path of reciprocation of mold portion 12. Hopper 24 is mounted on an upwardly apertured tube 27 forming an extension of a substantially closed grinder housing 26 which has a lateral inlet opening at 28. Limited angular adjustment of hopper 24 on tube 27, as indicated by arrow A in FIG. 3, is possible upon a loosening of a clamping nut 29.

An auger 30 is horizontally journalled in housing 26 and in the closed outer end of tube 27, the helicoidal web 30a of this auger extending from the region of hopper 24 past the inlet opening 28 into housing 26 and terminating at a chamber 31 in which a shaft 32 extends skew to the auger shaft 30b. Shaft 32 carries a pair of diametrically opposite rotary knives 33 co-operating with two stationary knives 34 on the inner walls of housing 26. An upwardly concave, cylindrically curved screen 35 underlies the grinder rotor 32, 33 to receive the comminution products of the scrap delivered by auger 30 from hopper 24 to chamber 31. The comminuted particles drop onto a chute 36 and are exhausted through a tube 37 by means of a suction pump not shown. Screen 35 is mounted on a drawer 38 which can be slid out of housing 26 for cleaning or replacement.

As best seen in FIG. 3, the axis of auger 30 is upwardly offset from that of tube 27 so that the circumference of web 30a defines with that tube a crescent-shaped clearance 39 accommodating a plurality of longitudinal ribs 40 (here three) which serve for the guidance of the scrap toward the chamber 31.

Auger 30 and rotor shaft 32 are continuously driven by a motor 41 which is positively coupled with shaft 32 through reduction gearing in a housing attachment 42 and is frictionally coupled with a gear shaft 43 via a belt drive 44 (FIG. 2). Shaft 43 carries a worm 145 which meshes with a worm gear 46 on auger shaft 30b. The belt drive 44 is accommodated in a further housing attachment 47.

It will thus be seen that I have provided an improved scrap grinder which is virtually foolproof in operation, is easily accessible to an operator standing in front of the machine, and cannot introduce any dust clouds into the mold 11, 12, owing to the continuous generation of an air draft blowing from the hopper 24 through the tube 27 into the space 31 which is under reduced pressure from suction tube 37; this air stream is intensified by the action of the continuously operating auger 30. If a large chunk of solid material, exceeding the capacity of the grinder, should fall through the hopper 24, belt 44 may slip and thereby avoid damage to the equipment; by the same token, an operator accidentally reaching into the hopper 24 during rotation of the auger will bring the latter to a halt before suffering serious injuries. Naturally, the belt drive 44 could also be replaced or supplemented by a slipping clutch.

Suction pipe 37 may, as diagrammatically indicated in FIG. 1, return the reground material to a hopper 48 on the molding machine for admixture with virgin thermoplastic resin; the same kind of feedback may, of course, also be had with the aid of equivalent mechanical force-feed means, such as a flexible auger.

These and other modifications, readily apparent to persons skilled in the art, are intended to be embraced with- in the spirit and scope of my invention as defined in the appended claims.

I claim:

1. In an injection-molding machine having a split mold with separable portions for the formation of molded articles and associated runners of thermoplastic material ejectable from said mold at different locations upon separation of said portions, the combination therewith of a grinder housing disposed below the level of said mold but horizontally offset from the point of ejection of said runners, said housing having a lateral opening and a feed tube extending generally horizontally from said opening to a location directly below said point of ejection to said housing, inlet means at the free end of said tube for receiving said runners from said mold, an auger in said tube leading from said inlet means into said housing, and grinder means in said housing for comminuting runners conveyed by said auger through said opening; said auger having an axis upwardly offset from the axis of said tube, thereby forming a crescent-shaped clearance at the bottom of said tube, the latter being provided with longitudinally extending rib means projecting into said clearance.

2. The combination defined in claim 1 wherein said grinder means comprises a set of rotary knives.

3. The combination defined in claim 2 wherein said auger and said knives are provided with common drive means.

4. The combination defined in claim 3 wherein said drive means includes a motor positively coupled with said knives and frictional transmission means between said auger and said motor.

5. The combination defined in claim 1 wherein said inlet means comprises an augularly adjustable hopper at the free end of said tube.

6. The combination defined in claim 1 wherein said housing is provided with a screen underneath said grinder means and with suction means below said screen for exhausting the products of comminution.

References Cited

UNITED STATES PATENTS

| | | | |
|---|---|---|---|
| 2,421,037 | 5/1947 | Ronning | 198—213 |
| 2,663,405 | 12/1953 | Messing | 198—213 |
| 2,867,314 | 1/1959 | Hansen | 198—213X |
| 2,995,775 | 8/1961 | Schnitzius | 18—30(FR)X |
| 3,000,055 | 9/1961 | Schlicksupp | 18—30(FR) |
| 3,077,972 | 2/1963 | Mitchell | 198—213X |
| 3,094,205 | 6/1963 | Siebring | 198—213X |
| 3,407,444 | 11/1968 | Rees | 18—30(FR) |

FOREIGN PATENTS 870,712   12/1941   France.

J. SPENCER OVERHOLSER, Primary Examiner

B. D. TOBOR, Assistant Examiner